United States Patent
Gillaspie et al.

(10) Patent No.: US 9,501,388 B2
(45) Date of Patent: Nov. 22, 2016

(54) METHOD AND SYSTEM FOR CREATING REFERENCE DATA

(71) Applicant: TestPlant Europe Ltd., London (GB)

(72) Inventors: Jonathan D. Gillaspie, Boulder, CO (US); Antony Edwards, London (GB); Robert McDougall, London (GB)

(73) Assignee: TESTPLANT EUROPE LIMITED, London (GB)

(*) Notice: Subject to any disclaimer, the term of this patent is extended or adjusted under 35 U.S.C. 154(b) by 70 days.

(21) Appl. No.: 14/640,995

(22) Filed: Mar. 6, 2015

(65) Prior Publication Data

US 2015/0254169 A1 Sep. 10, 2015

(30) Foreign Application Priority Data

Mar. 7, 2014 (GB) .................................. 1404100.8

(51) Int. Cl.
*G06F 11/00* (2006.01)
*G06F 11/36* (2006.01)

(52) U.S. Cl.
CPC ....... *G06F 11/3684* (2013.01); *G06F 11/3688* (2013.01); *G06F 11/3692* (2013.01)

(58) Field of Classification Search
USPC .......................................................... 714/38.1
See application file for complete search history.

(56) References Cited

U.S. PATENT DOCUMENTS

| | | | |
|---|---|---|---|
| 5,335,342 A | 8/1994 | Pope et al. | |
| 2003/0191987 A1 | 10/2003 | Brown | |
| 2004/0081346 A1* | 4/2004 | Louden | G06F 11/277 382/141 |
| 2007/0226540 A1* | 9/2007 | Konieczny | G05B 23/0248 714/26 |
| 2011/0113287 A1 | 5/2011 | Gururaj | |
| 2011/0184689 A1 | 7/2011 | Awedikian et al. | |
| 2012/0324281 A1* | 12/2012 | Goroff | G06F 11/2215 714/15 |

FOREIGN PATENT DOCUMENTS

| | | |
|---|---|---|
| CN | 1971535 A | 5/2007 |
| CN | 103109930 A | 4/2013 |
| GB | 2492874 A | 1/2013 |
| JP | H0981415 A | 3/1997 |
| JP | 2012103786 A | 5/2012 |
| WO | 2007055610 A1 | 5/2007 |

OTHER PUBLICATIONS

UKIPO Combined Search and Examination Report dated Sep. 10, 2014, for Patent Application No. GB1404100.8 filed Mar. 7, 2014.

(Continued)

*Primary Examiner* — Sarai Butler
(74) *Attorney, Agent, or Firm* — Conley Rose, P.C.

(57) ABSTRACT

A method for updating a test description for an automated computer test. The method includes comparing a received image from the system under test with one or more existing reference images to identify an expected image. If the expected image is not identified, the method further includes obtaining metadata for the expected image, using a processing device to create a new reference image using, at least, the said metadata, storing the new reference image using a storage device, updating the test description using the new reference image, and utilizing the updated test description in a further automated computer test.

14 Claims, 6 Drawing Sheets

(56) References Cited

OTHER PUBLICATIONS

UKIPO Combined Search and Examination Report dated Aug. 29, 2014, for Patent Application No. GB1404096.8 filed Mar. 7, 2014.

Proceedings Third International Workshop on Object-Oriented Real-Time Dependable Systems, 1997, Clarke et al., Automatic Generation of Tests for Timing Constraints From Requirements, pp. 199-206, DOI:10.1109/WORDS.1997.609955.

* cited by examiner

METHOD AND SYSTEM FOR CREATING REFERENCE DATA

CROSS-REFERENCE TO RELATED APPLICATIONS

The present application claims priority to Patent Application No. GB 1404100.8, filed Mar. 7, 2014, entitled "Method and System for Creating Reference Data," which is hereby incorporated herein by reference in its entirety.

BACKGROUND

The present disclosure relates to methods and systems for creating reference data, such as a reference image, for use with a computer test description for testing of computer programs, such as software applications.

In recent times, more and more computer programs are being developed and used to facilitate aspects of modern life. As computing power and demand for new software features increase, so does the complexity of software products and the code that drives them. This includes increased inter-operability with different devices and software applications. As the computer application and device market becomes more competitive, the number of different device types and operating systems also increases. A program developer is therefore often faced with various devices using various communication protocols and various other software applications to take into account when developing new software. As a result, the intended software product becomes increasingly prone to errors, flaws, failures, or faults (otherwise known as "bugs") in the program. Typically, these bugs are only discovered when the software is run. The testing of a software product, pre-launch, is therefore important to a software developer.

Software test engineers commonly testing the functionality and behavior of a program both pre and post launch. When performing testing, it is desirable to test out the software on a large number of devices and operating systems to ensure the product is ready for widespread sale for (and can be supported by) all types of computer system. A program which works well on one type of device may experience difficulties running on another type of device. The testing can therefore be a time consuming exercise. Accordingly, the test engineer may want to test multiple devices without having to physically interface with each System Under Test (SUT). Typically the same test will need to be executed a number of different times on the same operating system. Furthermore, when having to perform the same test on a number of different devices, the test engineer would ideally want to run the same sequence of steps without actually having to input each and every step for every test.

One of the most important times to test software is when new versions of the software are released. When such new versions are released, a development team typically creates a "candidate" version of the software. The software testers then test it to find bugs and send the candidate version back to the development team for improvement. The development team then creates a new "candidate". The testers then re-test it to find further bugs and again send it back to development. This loop continues until the software works correctly and it is delivered to customers.

At some further point in time, the development team will typically add some new features to the existing program. The testers then not only have to test the new features, but also that the old features have not broken (i.e. ceased to operate as desired) with the introduction of and/or interaction with the changes. This is called "regression testing". Therefore over the life of a software product, a single test case will be executed 10s, 100s, possibly 1000s of times.

Test programs are known to test the functionality of an SUT. Typically the test program is run upon a computing device or computing system that is remote from the SUT. The computer system running the test program is however in communication with the SUT so that the test program can interact with the SUT. The SUT may be, for example, a PC running a version of Microsoft Word™ upon a Windows 7™ operating system.

Test programs typically test an SUT by interacting with the SUT and validating the state of the SUT according to an input test description. Test descriptions may also be referred to as automated test descriptions. Test descriptions can take many forms including but not limited to text instructions, software in source code or binary form, work-flows in a diagrammatical form (such as a flow chart). Typically, test descriptions contain lines of text or other characters that when executed by the test program cause the SUT to perform particular actions or execute functions. Therefore executing (or "running") the test description through the test program allows the system under test to be tested automatically, without requiring a test engineer to provide input to the testing process, other than initiating it.

Some test programs that use automated test descriptions are known. One test program that helps software engineers automate the testing process is EggPlant™ by TestPlant™. The EggPlant™ software tool allows a user to create and subsequently execute an automated test description to test a large number of SUTs. This test program interacts and controls an SUT by receiving and analyzing images of the SUT Graphical User Interface (GUI).

Test programs such as EggPlant™ that utilize GUI images operate by identifying expected image objects in a GUI image that relate to executable functions that the test description may wish to identify and interact with or indicate the status of the SUT. Once the expected image object has been identified in the GUI image, the test program description can move to the next step in the test. The identification of the expected image object is performed using image analysis. The image analysis searches the GUI image for the expected image object using an existing reference image that is similar or identical to an expected image object. When a match is found, the expected image object is identified. Examples of image objects may include: an image of a button on the GUI that when "clicked" would open a dialogue box, or the presence of a particular graphical object that signified the completion of a particular action performed by the target program. The test program may use image analysis techniques to perform these comparisons.

Reference images are typically created when generating the test description. When generating the test description the user typically uses the test program in a "description creation mode," to navigate an SUT. Typically the navigation involves manually testing a particular SUT. As the user performs the testing steps, the information about the steps is entered into the test description. Thus when the test description is completed and subsequently run automatically by the test program to test a further SUT, the same testing steps are performed upon the further SUT.

The test description is typically created either manually and/or automatically by a test engineer using the test program. Where commands in the test description require the use of reference images as described above, the user creating the test description manually selects the desired portion of a GUI image (taken from the SUT being tested) using an image selection tool whereby the selected portion of the GUI image is saved as the reference image. Manually selecting images can become time consuming for the test engineer creating the test description.

Issues may also arise when new versions of the target software are made that cause a change in the graphical representation of the expected image object because the existing reference image may appear significantly different. Therefore the image analysis to identify the expected image object using an existing reference image may fail.

SUMMARY OF THE DISCLOSURE

According to an aspect, there is provided a method for creating reference data for an automated computer test, wherein the automated test comprises a test description and is configured, when executed, to cause a test computer system to communicate with a system under test, and, wherein the test computer system is configured to compare an expected image from the system under test with the reference data; and, wherein the system under test comprises one or more computer programs being executed upon a computer device; the method comprising the steps of: obtaining metadata for the expected image; using a processing device to create the reference data using, at least, the said metadata; storing the reference data using a storage device.

The reference data may comprise a reference image.

The test computer system may receive the expected image from the system under test.

The test computer system may identify the expected image from the comparison of the reference image with the expected image.

The system under test may comprise one or more computer programs being executed upon a computer device remote from the test computer system.

The method may be configured such that the automated computer test description is configured to be executed by a test program to cause the test computer system to: compare a received first image from the system under test with any one or more of: the created reference image; and/or an existing reference image; the first image including the expected image.

The automated computer test description may further be configured to be executed by a test program to cause the test computer to identify the expected image from the said above comparison.

The test description may be executed upon a test program using a test computer system.

According to a first aspect of the present disclosure, there is provided a method for updating a test description for an automated computer test, the automated test being configured, when executed, to cause a test computer system to communicate with a system under test comprising one or more computer programs being executed upon a computer device, wherein the test description is configured to be executed by a test program to cause the test computer system to perform an automated computer test by: comparing a received image from the system under test with one or more existing reference images to identify an expected image; wherein, if the expected image is not identified, the method further comprises: obtaining metadata for the expected image; using a processing device to create a new reference image using, at least, the said metadata; storing the new reference image using a storage device; updating the test description using the new reference image; and utilizing the updated test description in a further automated computer test.

The first aspect may be modified in any suitable way as disclosed herein including but not limited to any one or more of the following.

The method may be configured such that the metadata is obtained by: receiving the metadata with a receiving device; or, generating the metadata using from analysis of one or more information sources.

The method may be configured such that the metadata is obtained by: executing at least part of the test description to cause a test computer system to interact with a first system under test; and, storing metadata resulting from the said execution.

The method may comprise the steps of: receiving, with a receiving device, a first image from the first system under test; and, generating metadata from the first image.

The method may comprise the steps of: comparing the received first image with an existing reference image; and, generating metadata from the comparison.

The method may comprise the steps of: executing the said at least part of the test description to cause a test computer system to interact with a second system under test; and, receiving, with a receiver device, a second image from the second system under test, the second image comprising the expected image; and, generating the new reference image at least using the metadata and the second image.

The second system under test may be different to the first system under test by any one or more of the following: a different type or version of the application program and/or operating system, different firmware or middleware, different hardware. The differences between different "systems under test" are not necessarily limited to the above list.

The second or any further systems under test may each comprise one or more application programs being executed upon a computer device remote from the test computer system.

The metadata may comprise any one or more of: positional information associated with the expected image; graphical information associated with the expected image; timing information associated with the output of the expected image.

The positional information may comprise, but is not limited to, any one or more of: image size, relative position of a point in the expected image compared to a point in the first image, absolute position of the expected image.

Graphical information may comprise, but is not limited to, any one or more of: one or more colors of the expected image, a rotation of the expected image.

Timing information may comprise, but is not limited to, timing information associated with the first image sent by the first system under test.

The method may comprise the step of: storing the reference image upon a further computing system remote from the test computer system and the said system under test.

The method may comprise the step of: obtaining the metadata from a further computing system remote from the test computer system and the said systems under test.

The method may comprise the steps of: receiving an existing reference image at the further computing system; and, generating metadata using a processing device from the said received existing reference image.

According to a second aspect of the disclosure there is provided a computer readable medium comprising instructions configured when executed to give effect to the method as described in the first aspect and optionally, any one or more of the optional features of the first aspect described above.

According to a third aspect of the disclosure there is provided a computer system comprising: a processing device for creating the reference data; and, a storage device for storing the reference data; and, a computer readable medium described in the second aspect.

The computer system may comprise a receiver device configured to receive the metadata.

The computer system may comprise a transmitter device configured to send one or more communications to the system under test.

According to a fourth aspect of the disclosure there is provided a testing system comprising a computer system as described in the third aspect and a system under test.

The above summary does not provide an exhaustive list of inventive concepts. Other inventive concepts may be present from different features or elements or different combinations of features or element described herein. In particular, the above optional features or elements can be incorporated where suitable, in any combination, into any of the examples or embodiments as presented herein.

BRIEF DESCRIPTION OF THE DRAWINGS

Embodiments of the present disclosure will now be described in detail with reference to the accompanying drawings, in which.

DETAILED DESCRIPTION

There is presented herein a method for creating reference data for an automated computer test. The methods presented herein may be performed upon the executing of instructions stored upon one or more computer readable media. A system is also provided that is configured to perform the method/s as described herein. Typically the reference data comprises a reference image, but in principle may be any reference data.

The SUT and Test System

The automated test is configured when executed, to cause a test computer system 6 to communicate with an SUT 2. The communication between the SUT 2 and the test computer system 6 is intended to mean one or more pieces of data is transferred, either directly or indirectly, between the two entities, i.e. data sent directly or indirectly from the test computer system 6 to the SUT 2 and/or data sent directly or indirectly from the SUT 2 to the test computer system 6.

Figure 1:
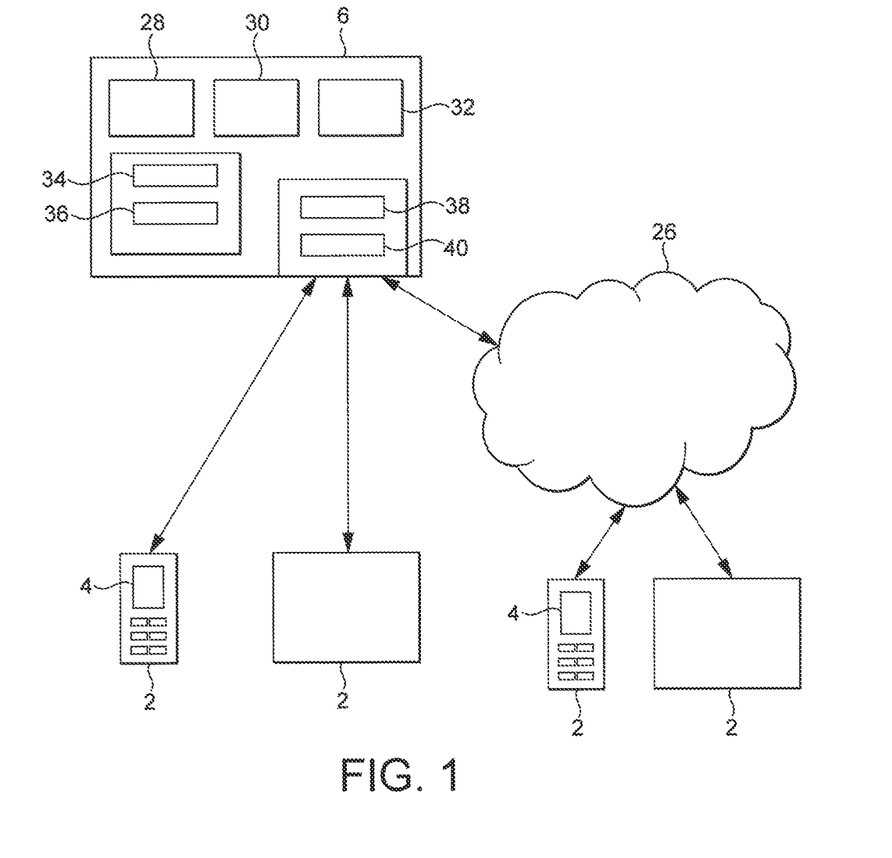
FIG. 1 shows an example of a test computer system that is in communication with several systems under test in accordance with various embodiments of the present disclosure.

By communicating with the SUT 2, the test computer system can interact with the SUT, for example by receiving GUI 4 images and/or sending commands to control the SUT. The automated test description is typically configured, when executed by a test program, to test the functionality and/or behavior of an SUT. A test computer 6 communicable with several SUTs 2 is shown in FIG. 1.

The term "test description" may also be termed throughout the application as an "automated test description".

Typically, a "test description" 24 forms part of an "automated test". The test description 24 is typically lines 62 of text or other characters that typically contain instructions, that when executed by the test program, cause the SUT 2 to perform particular actions or execute functions. An instruction in the description 24 can include one or more standard commands and/or one or more other pieces of information or data. For example, the command "Typetext" may be followed by the words "This is a test". The test program running the automated test would execute the standard command "Typetext" to cause the SUT 2 to type the words "This is a test" into a particular text entry box on the SUT GUI 4.

The automated test may have further metadata associated with the description. Such metadata may be, an image associated with a particular instruction in the description. The test may be stored using one or more storage device or computer readable media as described herein.

For the purposes of this application, when reference is made to the test program running the test description, this is taken to mean the running of the automated test.

The SUT 2 comprises one or more computer programs being executed upon a computer device.

The SUT 2 may be remote from the test computer system 6. The term "remote" is intended to mean that the computer system or device is physically separate to the test computer system 6 such that when the test computer system and remote computer system interact, one or more transmitter and receiver devices are used to send and receive data over one or more communication channels. The communication channel may be any suitable channel using any of electrical, electromagnetic or optical signals.

Figure 2:
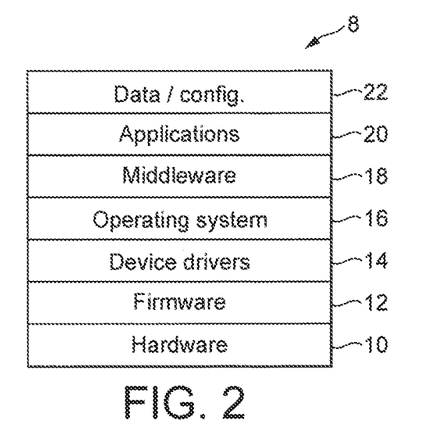
FIG. 2 shows an example of a hardware/software stack model representation for a system under test in accordance with various embodiments of the present disclosure.

The SUT 2 can be any computing system or device running one or more computer programs. FIG. 2 shows an example model of a hardware/software stack 8 for an SUT 2. The test computer system 6 can control features or aspects of any of these layers by interacting with the SUT 2. The SUT 2 in principle can include any one or more parts of the hardware/software stack 8 of the system being tested 2, i.e. the hardware 10, firmware 12, device drivers 14, operating system 16, middleware 18, applications 20 and data/config 22. Typically an SUT 2 will at least comprise hardware 10 and an operating system 16. FIG. 2 is only an example of a hardware/software stack model 8. Other models with further details and layers may also be used to define an SUT 2. The term "computer program" is taken to mean any of (but not necessarily limited to) an application program 20, middleware 18, an operating system 16, firmware 12 or device drivers 14 or any other medium supporting executable program code.

The term "hardware" 10 is taken to mean any one or more of the collection of physical elements that constitutes a computer system/device such as, but not limited to, a processor, memory device, communication ports, input/output devices.

The term "firmware" 12 is taken to mean any persistent memory and the program code/data stored within it, such as but not limited to, an embedded system.

The term "device drivers" 14 is taken to mean the one or more programs that operate to control a particular type of device incorporated into or attached to the computer device/system.

The term "operating system" 16 is taken to mean the one or more pieces, often a collection, of software that manages computer hardware and provides common services for computer programs.

The term "middleware" 18 is taken to mean the computer software that provides services to software applications beyond those available from the operating system 16.

The term "applications" 20 is taken to mean the computer software that causes a computing device or system to perform tasks that are typically beyond the running of the computer itself.

The term "data/config" 22 is taken to be any other information provided to the SUT 2 that can be used to affect its running or output, for example data input into the application program 20.

An SUT 2 may comprise a different physical device to another SUT 2 as shown in FIG. 1. For example, the SUTs may be different physical computing devices running the same application program 20 using the same or different application program 20.

Alternatively, an SUT 2 may differ from another SUT 2 simply by running a different operating system 16 and/or different version of one or more application programs 20. For example, a first SUT 2 may be a PC (i.e. the computer hardware) running an operating system 16 and a first version of an application program 20, whereas a second SUT 2 may be the same hardware 10 as the first SUT 2, running the same type and version of the operating system 16 but running a second, updated version of the application program 20. In principle, one SUT 2 may differ from another SUT 2 by virtue of any different hardware/software configuration. For example any change in any one or more of the layers in the stack 8 of FIG. 1 from hardware 10 to application program 20, may give rise to a different SUT 2.

Typically when the test computer device interacts with the SUT 2, it does so using a test program that executes the test description 24. Typically the test program is hosted on the test computer system 6. The description 24, when run (executed) by the test program, typically causes the SUT 2 to be controlled by the test computer system 6. For example, a line in the test description 24 run by the test program with the phrase "click button X" will cause button 'X' on the GUI 4 of the SUT 2 to be selected and the operation associated with the selection of that button to be started upon the SUT 2.

FIG. 1 shows an example of a test computer system 6 in communication with several SUTs 2. Two of the SUTs 2 are being communicated with directly, for example using infrared or blue tooth communications, or over a local wired or wireless network, whilst two other SUTs are being communicated with via the internet 26.

The test computer device/system 6 may be any suitable computer device, system, collection of computing devices or collections of computing systems. The test computer system 6 may comprise any one or more of: one or more processors 28; one or more controller devices 30; one or more memory devices 32; one or more user input devices 36; one or more output devices 34 such as, but not limited to, a GUI; one or more communication devices such as a transmitter 38 and/or a receiver device 40.

Any one or more of the processor 28, controller 30, receiver 40, transmitter 38, or memory 32 may be a physical, non-transitory, device or apparatus. The devices/apparatus may be electronic, opto-electronic or optical.

The processor 28 may, in principle, be any suitable processing device such as, but not limited to, a microprocessor, an application-specific instruction-set processor, a graphics processing unit (GPU/VPU), a physics processing unit (PPU), a digital signal processor, a network processor, a front end processor. Examples of processors include, but are not limited to, an Intel™ processor, an AMD™ processor.

The controller 30 may be any suitable controller including any one or more of a controller chip, a controller board, a mainframe controller, an external controller or any other suitable controller. The controller may be, for example, a micro-controller.

The memory 32 may, in principle be any suitable memory including any one or more of: mechanical memory such as, but not limited to, magnetic tape drive, hard-drive, optical drive; volatile and non-volatile memory such as, but not limited to, RAM, DRAM, SRAM, SDRAM, T-RAM, Z-RAM, TTRAM, ROM, Mask ROM, PROM, EPROM, EEPROM, NVRAM.

Figure 3:
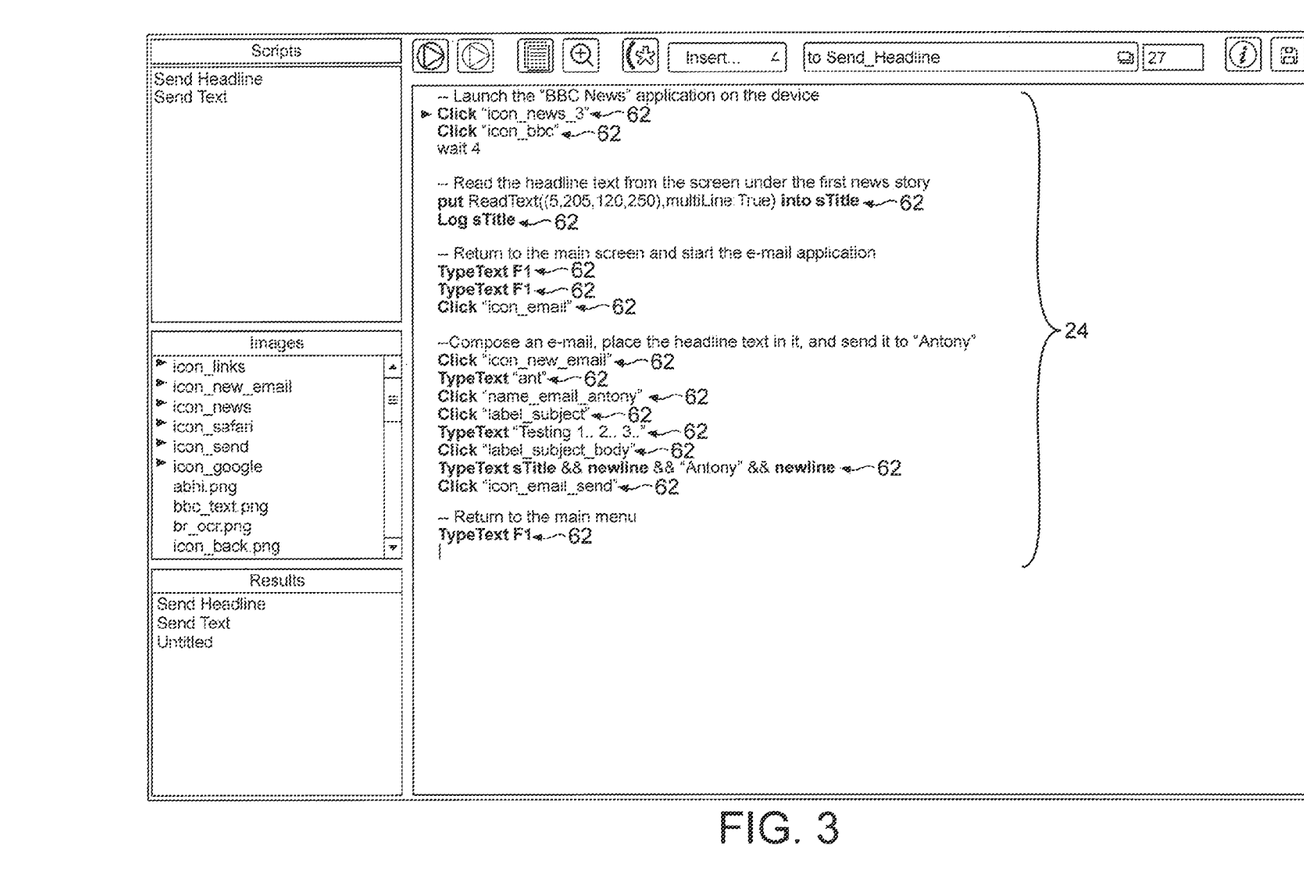
FIG. 3 shows an example of a test description in accordance with various embodiments of the present disclosure.

FIG. 3 shows an example of a test description 24 run within a test program. The test description 24 comprises multiple lines of text, numbers or other symbols that are typically executed by the test program in a sequential manner.

The description 24 may be written in any suitable scripting language, for example SenseTalk™. Preferably the description is loadable onto a carrier device such as a disc, memory stick or any other suitable electronic data carrier.

Using GUI Images

The test program may utilize one or more GUI 4 images received directly or indirectly from the SUT 2. Typically the GUI 4 images are "snapshots" of the output of the GUI 4 of the SUT 2 at a particular time. Typically these snapshots are saved as a graphical image file, for example a bitmap, gif or jpeg file. The GUI 4 images may be a snapshot of the whole GUI 4 or one or more portions of the GUI 4. GUI snapshots may be only portions of the GUI image that have changed since a previous GUI image was sent.

It is understood that a test program is typically used to execute the test description 24. However, the functionality required to execute the test description 24 may be hosted by an operating system or any other software or dedicated hardware, for example the test description 24 may be a standalone executable file itself.

The SUT 2 may send these GUI images to the test computer system 6 automatically upon an initial command to start sending the images. Additionally or alternatively the SUT 2 may send one or more GUI images upon a command sent from the test computer system 6. Additionally or alternatively the SUT 2 may send one or more GUI images upon a command sent to the SUT 2 resulting from an instruction from the test program, and/or the test description 24.

The GUI images may be sent continuously by the SUT 2 at a particular update frequency, for example the SUT 2 may send a new GUI image to the test computer every 0.3 seconds.

The GUI images provided in the image updates according to the example above and any of the methods/systems described herein, may in principle be one or more images. The images may be rectangular or take any other shape and be in any image format such as '.bmp,' '.jpeg', '.png' file format.

The GUI images received from the SUT 2 may be stored by one or more memory elements 32. The memory elements 32 may be housed within and/or are part of the test computer system 6. Additionally or alternatively one or more memory elements may be housed remotely from, but in communication with, the test computer system 6.

Typically, at a given line in the description 24, the test computer/program will select the latest GUI image stored by the memory element and perform an image analysis on the GUI image to find an expected image. The expected image may be the whole GUI image or one or more parts of the GUI image.

The GUI image that the test computer 6 compares, to find the expected image may, in some situations, only include the one or more sub section/s of the GUI 4 output most recently sent by the latest GUI image update from the SUT 2. Alternatively, the GUI image that is compared may be a composite image based upon all the GUI images sent by the SUT 2 that represent the current whole GUI 4 output.

Figure 4A:
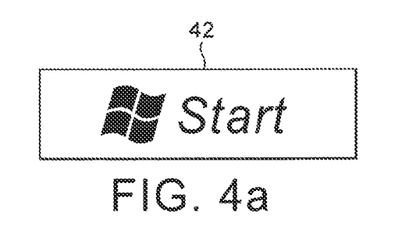
FIG. 4a shows an example of an expected image object in accordance with various embodiments of the present disclosure.
Figure 4B:
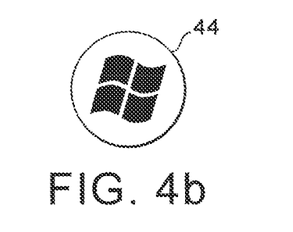
FIG. 4b shows an updated version of the expected image object shown in FIG. 4a in accordance with various embodiments of the present disclosure.

The expected image may be an image that indicates a particular action has been accomplished by the SUT, for example, the expected image may be part of a dialogue box with the phrase "Congratulations you have created your test file". The expected image may be an image that represents an interactive feature on the GUI of the SUT that the test program wishes to utilize. For example a round button 44 as shown in FIG. 4b, which when selected and activated on the SUT GUI 4 will cause a pop-up menu to appear that the test program can then further utilize in the testing of the SUT 2. The expected image may be the whole GUI image or one or more parts of the GUI image.

When performing the image analysis to identify the expected image, the test program uses existing reference images that are associated with the expected graphical make-up of the expected image. Typically these reference images will be similar or identical to the expected image such that the test program can search the GUI image for a graphic similar to or identical with the reference image.

The test program may utilize various methods of performing this image analysis and may try to "match" the reference image to at least a portion of the GUI image/s using any suitable image analysis technique. This may include, for example, having to re-size or rotate the reference image to find a match.

Expected images contained within the GUI image may be associated with "events" that are activate-able within the SUT 2 as discussed above. For example the reference images of the start buttons 42, 44 shown in FIG. 4a or 4b respectively. These "events" may be utilized by the test program. Each event is executable in the SUT 2 by the selection of a particular one or more activating pixels or "hotspots". The hotspots may be within the expected image or outside of the expected image. For example, in FIG. 4a, the hotspot may be one of the pixels making up the 'a' of the word "Start".

Creating a Reference Image

The methods described herein create a reference image by firstly obtaining metadata for the expected image. A processing device is then used to create the reference image using, at least, the metadata. The created reference image is then stored using a storage device. The newly created reference image may then be used by the test program to compare against GUI images received from the same SUT or a different SUT. The method described herein may create one or more references image from the metadata. The method may create one or more reference images for the whole test description 24 or part of the test description 24. Different types of metadata may be used to generate different reference images.

A reference image created using the method/s described herein may be a new version of an existing reference image for a test description 24. Existing reference images may take the form of metadata associated with the test description and may be stored with the test description, for example stored on a computer readable medium or any other storage device. Such a new version may need to be created, for example, because a new version of one or more the application programs 20 running on the SUT 2 is being used. For example, the existing reference image 42 shown in FIG. 4a for the "Start button" on a GUI 4 of the SUT 2, may have been applicable for certain versions of the Windows™ operating system running on an SUT 2, such as Windows XP™. However, if another SUT 2 is using Windows 7™, then the same button will now be represented on this other SUT GUI as the button 44 shown in FIG. 4b. When the test program, running the description 24, comes to a description command line 62 that wishes to identify the "Start button" on the SUT GUI 4, the test program will not be able to find the new button in the GUI image because the new button 44 displayed by the SUT GUI (shown in FIG. 4b) is graphically different to the existing reference image 42 of FIG. 4a.

A reference image created by the methods described herein may also be used to create the original reference image for the description 24. When the user (computer test engineer) initially creates the test description 24, he/she typically runs the test program in a "description generation mode" so that an example SUT 2 is controlled and the testing steps are manually input into the description 24. As the user navigates the SUT 2, there will be the need for the user to create command lines 62 that find an expected image from within a GUI image of the SUT 2, as described above. The method may therefore create reference images from metadata without the presence of existing reference images.

Obtaining Metadata

The metadata used to generate the reference images may in principle be any metadata including, but not limited to, structural metadata and descriptive metadata. The reference image may be generated using any of: all of a particular piece of metadata obtained, part of the metadata obtained; multiple pieces of different metadata obtained, different types of metadata obtained, the metadata together with one or more other form of data or information.

The metadata associated with the expected image and can come from, but is not limited to, any information associated with any of the layers in the software/hardware stack 8 as shown in FIG. 2. The metadata would typically be data or information that would directly, or indirectly, have an input upon, or otherwise be indicative of, an aspect of the outputting of the expected image. The outputting of the expected image may cover any one or more of a graphical aspect of the expected image, an absolute or relative position of the expected image within a GUI image, an absolute or relative timing of the output of the expected image or any other output related data.

The following are non-limiting examples of the methods described herein to generate a reference image. It is understood that aspects, features, elements and steps of each of the these examples may be used by other examples where technically appropriate and may be modified in any way as disclosed herein.

The first example may be termed "train-retrain mode". In this example, metadata is obtained by running an existing test description 24 so that the test computer 6 interacts and tests one or more SUTs 2 using existing reference images. This SUT is preferably one where the test engineer knows, (before the test description 24 is run) that the reference images will match with the expected images within the GUI images provided to the test computer 6 by the SUT 2. This SUT may be termed a "known" or "good environment".

Figure 5:
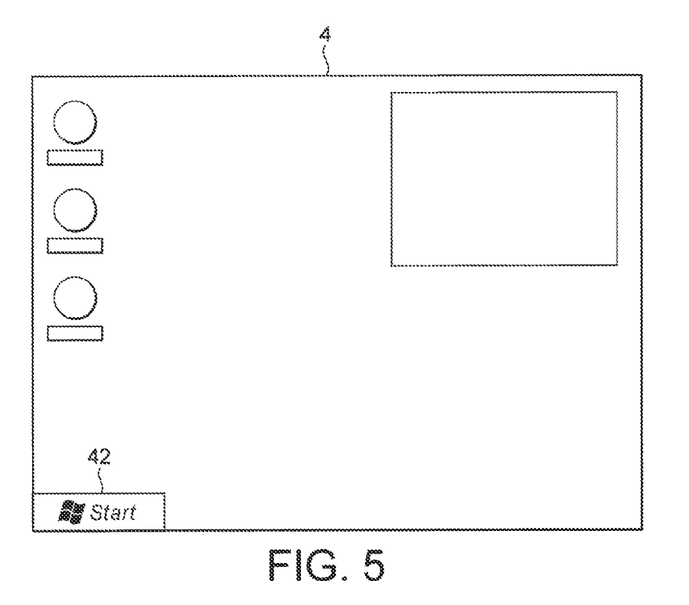
FIG. 5 shows an image of a GUI from a system under test with the image object of FIG. 4a in accordance with various embodiments of the present disclosure.

In the "train" part of this example, when a command line 62 is reached during the running of the test description 24 that requires identification of an expected image, the test program uses the associated existing reference image to find and identify the expected image from within the latest GUI image sent by the SUT 2. If found, the method then records metadata associated with this "identified" expected image. FIG. 5 shows an example of a GUI image provided by a known SUT 2 in the "train" part of this example where the SUT 2 is running Windows XP. The expected image is shown in the bottom left hand corner of the GUI image. This expected image is identical to the existing reference image 42 (shown in FIG. 4a) used by the test description 24 for this particular line of the test description 24. For the example in FIG. 5, the method records metadata on the position of the identified expected image within the GUI image and the graphic of the standard windows symbol of the four adjacent warped squares. These data types may be chosen automatically or by a user. The reasons for the choices of metadata to be stored may be attributed to any of: known recurring themes, colors, symbols, graphical positions within different versions of the same computer program. This process is carried out for all of the existing reference images in the whole test description 24.

Figure 6:
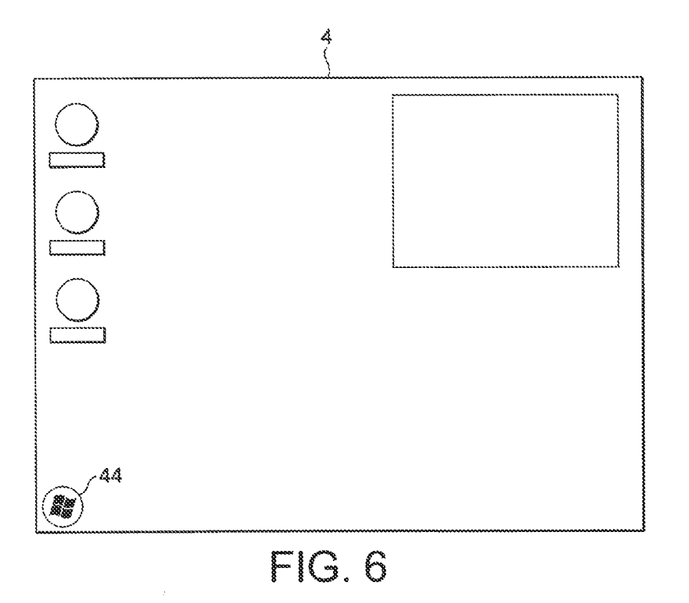
FIG. 6 shows an image of a GUI from a similar system under test in FIG. 5 with the updated image object of FIG. 4b in accordance with various embodiments of the present disclosure.

Once the "train" part of this example is completed and the metadata collected for all the expected images, the method then performs the "re-train" part of this example. It is noted that the "re-train" part of this example may be performed at any time after the "train" part. The test description 24 is then executed again on a further SUT 2 that is different to the known SUT 2. This "other" SUT 2 can be termed the "unknown" SUT 2. For example, the unknown SUT 2 is a different computer system, but of the same computer type, running the same application program 20 but using a different operating system 16. As the test description 24 is run on the unknown SUT 2 it will come to a point where an image analysis is required of the latest GUI image from the unknown SUT 2. The method will then search the latest received GUI image, not find the expected image, and return a failure in the execution of the step. The method will then use the metadata previously recorded (for the expected images associated with this step), and together with the latest GUI image, generate a new reference image. FIG. 6 shows an example of this scenario, following on from FIG. 5, where the unknown SUT 2 is running Windows 7 (as opposed to Windows XP in FIG. 5). The expected image is again shown in the bottom left hand corner. The test program will not be able to match the existing rectangular "start" reference image 42 to the expected image in the GUI image shown in FIG. 6 and thus will return a failure. The method then uses the position and graphical metadata indicative of the expected image to find a portion of the GUI that could be used as a new reference image. In this example the method finds, through image analysis using the metadata as a guide, the symbol 44 as shown in FIG. 4b. This may be automatically stored as metadata associated with the test description, or sent to a user for approval before storage. If the user disapproves then the method may perform another step to provide another reference image candidate, for example by looking at the next available GUI image sent to the test computer 6. Multiple new reference images may be obtained in this way for an existing reference image. The testing of the unknown SUT 2 would then continue onto the next step in the test description 24.

Once the re-train part of the method has been completed for the whole test description 24, the test description 24 then has a set of new reference images for the expected images that it can utilize. The updated test description 24 can then be used, in an automated test, to test further SUTs using the Windows 7 operating system.

Variations on Train-Retrain Mode:

The above example termed "train-retrain mode" may be modified or adapted in many ways as presented herein. Furthermore, any of the principles, features and elements of this example may be used in any other methods described herein.

Variations of the "train-retrain mode" may include, but are not limited to, using different metadata instead of or as well as the metadata detailed above. This may be timing data, for example, when in "train" mode, the method records the time it takes for the particular expected image to appear in a GUI image. This may be recorded as absolute time data or relative time data with respect to another feature appearing on the GUI 4. Such metadata may be useful to help identify a new reference image in "retrain" mode when the task that the SUT 2 has been instructed to undertake will take a great deal of processing time before the GUI image displays an expected reference image indicative of the task being completed.

Any of the train/retrain mode steps may be undertaken for particular portions of the test description 24 and not the whole description 24. For example, if the only thing that has changed is the operating system version 16, then it may be understood that new reference images are only required for those steps in the test description 24 where the expected image is one that will "look" different because of the new operating system 16.

The data in the "train" mode may be gathered from a plurality of "train" runs of the software on different SUTs 2. For example, the test program may always run the "train" part of "train-retrain" mode for a particular test description 24 and continually gather metadata during the normal running of the test description 24.

Where the method has obtained more than one piece of metadata, then this different metadata obtained may be used either by itself, or in different combinations, to allow the method to provide multiple versions of new reference images when run on the unknown SUT 2. The method may use different metadata sources by analyzing them prior to the generation of a new reference image to determine commonalities in metadata. Only the most common metadata may then be used to generate the new reference image. In principle, the method may use any type of analysis upon multiple pieces of metadata to calculate, select or otherwise determine the metadata to be used to generate a new reference image.

The metadata may be provided from many different sources or by analyzing different sources. For example, the method may obtain metadata about an expected reference image by analyzing the source code of one or more software applications 20 running on the SUT 2. The method may analyses similar software applications 20 used in different SUTs 2 (for example a known and unknown SUT) and identify differences between the two programs 20 that would lead to changes in the output of an expected image.

The method may not require the "retrain mode" to fail. The method may simply identify one or more portions of the test description 24 requiring the analysis of a GUI image for an expected image, and create new reference images without trying to find the expected image with an existing reference image. This may be, for example, where it is known upfront, that particular reference images will no longer be valid. This may be determined upfront in many ways, including any of: user input, or the method analyzing using a computer device, one or more information sources that would lead to this conclusion.

The method may not require a "train-mode" to obtain metadata. Metadata may be obtained from other sources such as user input or source code as described above.

The method may generate new reference images without having an existing reference image. For example the user may input metadata that the method uses to help identify the expected image and hence generate the reference image. If a GUI image similar to that shown in FIG. 5 was presented to the test program and no existing reference image was stored, then the method may use other metadata such as the user typing in the word "start". This user input may be taken from data that the user inputs in the initial creation of the test description 24.

Figure 7:
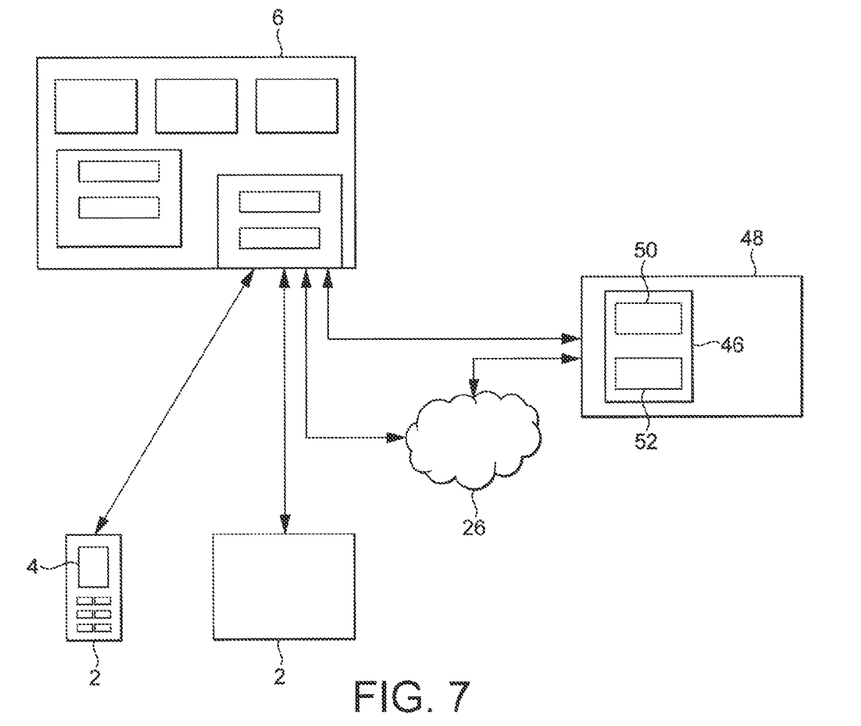
FIG. 7 shows an example of a test computer system in communication with several systems under test and a remote server comprising a database in accordance with various embodiments of the present disclosure.

FIG. 7 shows an example of a system using the method as described herein where reference images are stored upon an external memory/storage device that is remote from the test computer system.

The external device may be a central server or other computer system with access to one or more communication devices such that one or multiple test computer systems 6 can send or retrieve reference images to/from the server.

The server may operate one or more databases or other information handling systems on one or more memory devices. The databases may store multiple different reference images. One database 50, or a part of one or more databases, may be available to all test computer systems 6 or a set of one or more test computer systems and store reference images generated from those test computer systems 6. The test systems 6 with access to that database 50 may therefore be able to access the reference images created by other test computer systems 6. This may be beneficial, for example, where different companies that make software applications 20 (and test them using a test system as described) need to update reference images because of a new change in a common operating system 16 that their application programs 20 run upon. If a first user creates reference images according to any of the methods described herein and stores them on the database 50, then other users can subsequently use the same reference images by retrieving them from the same accessible database 50, therefore saving processing time.

The example shown in FIG. 7 is also advantageous where multiple different versions of reference images for expected images are known. For example the "Start" buttons 42, 44 shown in FIGS. 4a and 4b may have many other graphical variants resulting from different operating systems versions 16. A test computer 6 analyzing a GUI image for an expected image may access the remote server 48, download (prior to or during image analysis of the GUI image) all the possibly applicable reference images and use them to try and identify (match) the expected image.

Additionally or alternatively the server 48 may generate reference images itself using any of the methods described herein and make them available to those systems accessing the database 50. This may include analyzing reference images stored upon the database 50 for common themes and creating metadata based on the analysis. The server 48 may also generate reference images using metadata and store them, i.e. predicting new reference images. The server 48 may comprise hardware elements similar to those described for the test computer system 6.

The server may also comprise restricted database records 52 that only one or a select subset of test computers 6 or users can access. This may be useful, for example, where a particular company is testing a new version of its own software 20 and does not want others outside its organization to see its new images prior to release of the software 20.

Embodiments of the present disclosure have been described with particular reference to the examples illustrated. However, it will be appreciated that variations and modifications may be made to the examples described within the scope of the present disclosure.

The methods described herein may be embodied in one or more pieces of software. The software is preferably held or otherwise encoded upon a memory device such as, but not limited to, any one or more of, a hard disk drive, RAM, ROM, solid state memory or other suitable memory device or component configured to software. The methods may be realized by executing/running the software. Additionally or alternatively, the methods may be hardware encoded.

The method encoded in software or hardware is preferably executed using one or more processors. The memory and/or hardware and/or processors are preferably comprised as, at least part of, one or more servers and/or other suitable computing systems.

Variations of the above embodiments will be apparent to the skilled person. The precise configuration of hardware and software components may differ and still fall within the scope of the present disclosure. Embodiments of the present disclosure have been described with particular reference to the examples illustrated. While specific examples are shown in the drawings and are herein described in detail, it should be understood, however, that the drawings and detailed description are not intended to limit the disclosure to the particular form disclosed. It will be appreciated that variations and modifications may be made to the examples described within the scope of the present disclosure.

What is claimed is:

1. A method for updating a test description for an automated computer test, the automated test being configured, when executed, to cause a test computer system to communicate with a system under test comprising one or more computer programs being executed upon a computer device, wherein the test description is configured to be executed by a test program to cause the test computer system to perform an automated computer test by:
   comparing a received image from the system under test with one or more existing reference images to identify an expected image;
   wherein, if the expected image is not identified, the method further comprises:
   obtaining metadata for the expected image;
   using a processing device to create a new reference image using, at least, the said metadata;

storing the new reference image using a storage device;
updating the test description using the new reference image; and
utilizing the updated test description in a further automated computer test.

2. The method as claimed in claim 1 wherein the metadata is obtained by:
receiving the metadata with a receiving device; or
generating the metadata using from analysis of one or more information sources.

3. The method as claimed in claim 1 wherein the metadata is obtained by:
executing at least part of the test description to cause a test computer system to interact with a first system under test; and
storing metadata resulting from the said execution.

4. The method as claimed in claim 3 comprising the steps of:
receiving, with a receiving device, a first image from the first system under test; and,
generating metadata from the first image.

5. The method as claimed in claim 4 comprising the steps of:
comparing the received first image with an existing reference image;
generating metadata from the comparison.

6. The method as claimed in any of claim 3, comprising the steps of:
executing the said at least part of the test description to cause a test computer system to interact with a second system under test;
receiving, with a receiver device, a second image from the second system under test, the second image comprising the expected image;
generating the new reference image at least using the metadata and the second image.

7. The method as claimed in claim 1, wherein the metadata comprises any one or more of:
I) positional information associated with the expected image;
II) graphical information associated with the expected image;
III) timing information associated with the output of the expected image.

8. The method as claimed in claim 1, comprising the step of:
storing the new reference image upon a further computing system remote from the test computer system and the said system under test.

9. The method as claimed in claim 1, further comprising the step of:
obtaining the metadata from a further computing system remote from the test computer system and any of the said systems under test.

10. The method as claimed in claim 9 further comprising the steps of:
receiving an existing reference image at the further computing system;
generating metadata using a processing device from the said received existing reference image.

11. A non-transitory computer-readable medium comprising instructions that when executed by a processor of a test computer system, cause the processor to:
compare a received image from a system under test with one or more existing reference images to identify an expected image;
wherein, if the expected image is not identified, the executed instructions further cause the processor to:
obtain metadata for the expected image;
create a new reference image using, at least, the said metadata;
store the new reference image using a storage device;
update the test description using the new reference image; and
utilize the updated test description in a further automated computer test.

12. A computer system comprising:
a processing device for creating reference data; and
a storage device for storing the reference data;
wherein the processing device is configured to:
compare a received image from the system under test with one or more existing reference images to identify an expected image;
wherein, if the expected image is not identified, the processing device further obtains metadata for the expected image;
creates a new reference image using, at least, the said metadata;
stores the new reference image at the storage device;
updates the test description using the new reference image; and
utilizes the updated test description in a further automated computer test.

13. The computer system as claimed in claim 12 comprising a receiver device configured to receive the metadata.

14. The computer system as claimed in claim 12 further comprising a transmitter device configured to send communications to the system under test.

* * * * *